United States Patent [19]

Yabusaki et al.

[11] Patent Number: 5,513,211

[45] Date of Patent: Apr. 30, 1996

[54] RADIO COMMUNICATION SYSTEM WITH CONTROLLED VOICE CODE SWITCHING

[75] Inventors: Masami Yabusaki; Kouji Yamamoto, both of Saitama; Shinji Uebayashi, Kanagawa, all of Japan

[73] Assignees: Nippon Telegraph and Telephone Corp; NTT Mobile Communications Network Inc., both of Tokyo, Japan

[21] Appl. No.: 249,077

[22] Filed: May 25, 1994

Related U.S. Application Data

[63] Continuation of Ser. No. 849,197, Mar. 11, 1992, abandoned.

[30]  Foreign Application Priority Data

Sep. 2, 1991 [JP] Japan .................................. 3-246430

[51] Int. Cl.$^6$ .............................. H04B 1/38; H04L 5/16
[52] U.S. Cl. .......................... 375/219; 455/53.1; 379/258
[58] Field of Search ................................. 379/58, 59, 90, 379/258, 230; 455/53.1, 54.1, 38.1, 14; 375/377, 242, 243, 219

[56]  References Cited

U.S. PATENT DOCUMENTS

| | | | |
|---|---|---|---|
| 4,330,886 | 5/1982 | Fukuda et al. | 370/62 |
| 4,723,272 | 2/1988 | Maat | 379/230 |
| 4,924,480 | 5/1990 | Gay et al. | 375/8 |
| 4,996,708 | 2/1991 | Kakizawa | 379/216 |
| 5,148,271 | 9/1992 | Kato et al. | 375/25 |

Primary Examiner—Stephen Chin
Assistant Examiner—Hai H. Phan
Attorney, Agent, or Firm—Martin Novack

[57]  ABSTRACT

A radio communication system operates between two radio terminals, and/or between a radio terminal and a fixed terminal through a network. In the present disclosure, the switching of codec-release mode and codec mode in the network is controlled by using a specific control line which is installed in addition to a speech line. Thus, when a radio terminal communicates with another radio terminal through a network, no codec is used in the network, and so, speech distortion and signal delay are not deteriorated due to signal conversion by using a codec.

3 Claims, 6 Drawing Sheets

RADIO COMMUNICATION SYSTEM WITH CONTROLLED VOICE CODE SWITCHING

This is a continuation of U.S. application Ser. No. 07/849,197, filed Mar. 11, 1992, abandoned.

BACKGROUND OF THE INVENTION

The present invention relates to a radio communication system between a radio terminal and a fixed terminal, and/or between radio terminals. In particular, the present invention relates to such a system which provides excellent speech quality avoiding multiple encoding/decoding operations between a radio link and a network.

In order to save bandwidth, and thus reduce transmission costs, in a digital radio communication system, a speech signal is encoded with a low bit rate, for instance 8 kilobits/second (kbps), by exploiting redundancies in the speech signals and compressing the signals. On the other hand, a fixed network uses a coding system with typically 64 kbps.

Therefore, when a radio terminal communicates with a fixed terminal, a coding system must be converted between a low bit rate signal in a radio link and a high bit rate signal in a fixed link.

FIG. 6 shows a prior radio communication system with a network. In the figure, the numeral 1 is a fixed terminal coupled with a network, $2_1$ and $2_2$ are radio terminals which communicate not only with a fixed terminal, but also with a radio terminal, $3_1$ and $3_3$ are base stations for coupling radio terminals with the network through radio link, 4 is an exchange station for exchange and control of the terminals 1, $2_1$ and $2_2$, and 7 is an exchange switch installed in the exchange station 4 for the exchange of the terminals. The numerals $8_1$ and $8_2$ are codecs for converting a voice code between a radio-specific voice code which is used in a radio terminal, and a wired-line voice code which is used in a network.

When a fixed terminal 1 communicates with a radio terminal $2_1$, a codec $8_1$ converts a radio-specific voice code of the radio terminal to a wired-line voice code, and vice versa.

Similarly, when the radio terminal $2_1$ communicates with another radio terminal $2_2$, the codec $8_1$ converts the radio-specific voice code from the radio terminal $2_1$ to the wired-line voice code which is used in the network, and then, another codec $8_2$ converts said wired-line voice code from the codec $8_1$ to the radio-specific voice code which is forwarded to the radio terminal $2_2$ through the base station $3_2$. A voice signal from the radio terminal $2_2$ is also converted to the radio specific voice code through the wired-line voice code by two codecs $8_1$ and $8_2$.

Accordingly, the conventional radio communication system has the disadvantage that when a radio terminal communicates with another radio terminal, a voice code is first converted to a wired-line voice code, and then, converted back to a radio-specific voice code. The process of voice signal twice in codecs deteriorates speech quality in speech distortion and/or delay time.

The U.S. Pat. No. 4,924,480 describes codecs with suppression of multiple encoding/decodings across a connection. In that prior art, a fixed network operates with high bit rate of 64 kbps, and each speech signal is encoded by using 8 bits ($B_1$ through $B_8$). A codec communicates its presence to another codec on the high bit rate side is based on the transmission of predetermined synchronization patterns inserted in the signals, for instance the least significant bit $B_1$. That is to say, one bit of 8 bits of speech encoding is used merely for switching of a codec beween codec-free mode and codec mode, and a speech is encoded by using only 7 bits. As the number of bits for speech encoding is decreased for the switching of a codec, that prior art has the disadvantage that the speech quality is deteriorated.

SUMMARY OF THE INVENTION

It is an object of the present invention to provide a new and improved radio communication system through fixed network by overcoming the disadvantages and limitations of such a system in a prior art.

It is also an object of the present invention to provide a radio communication system through a fixed network, with excellent speech quality by avoiding speech degradation because of multiple encoding/decoding.

The above and other objects are attained by a radio communication system comprising a plurality of radio terminals which operate with a first voice coding system; a network coupled with said radio terminals through radio link, operating with a second voice coding system, said network having a plurality of base stations for coupling the network with said radio terminals through radio link, a plurality of exchange stations each having an exchange switch for exchanging calls, and a plurality of codecs for converting voice coding systems between said first coding system and said second coding system; wherein said network has a selector for switching each of said codecs between a codec release mode and a codec mode; and wherein when a radio terminal is coupled with another radio terminal through said network, said selector selects a codec release mode so that multiple coding/decoding is avoided, and when a radio terminal is coupled with a fixed terminal, said selector selects a codec mode for conversion between said first voice coding system and said second voice coding system.

Preferably, a specific control line for controlling said selector is provided among said exchange stations.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
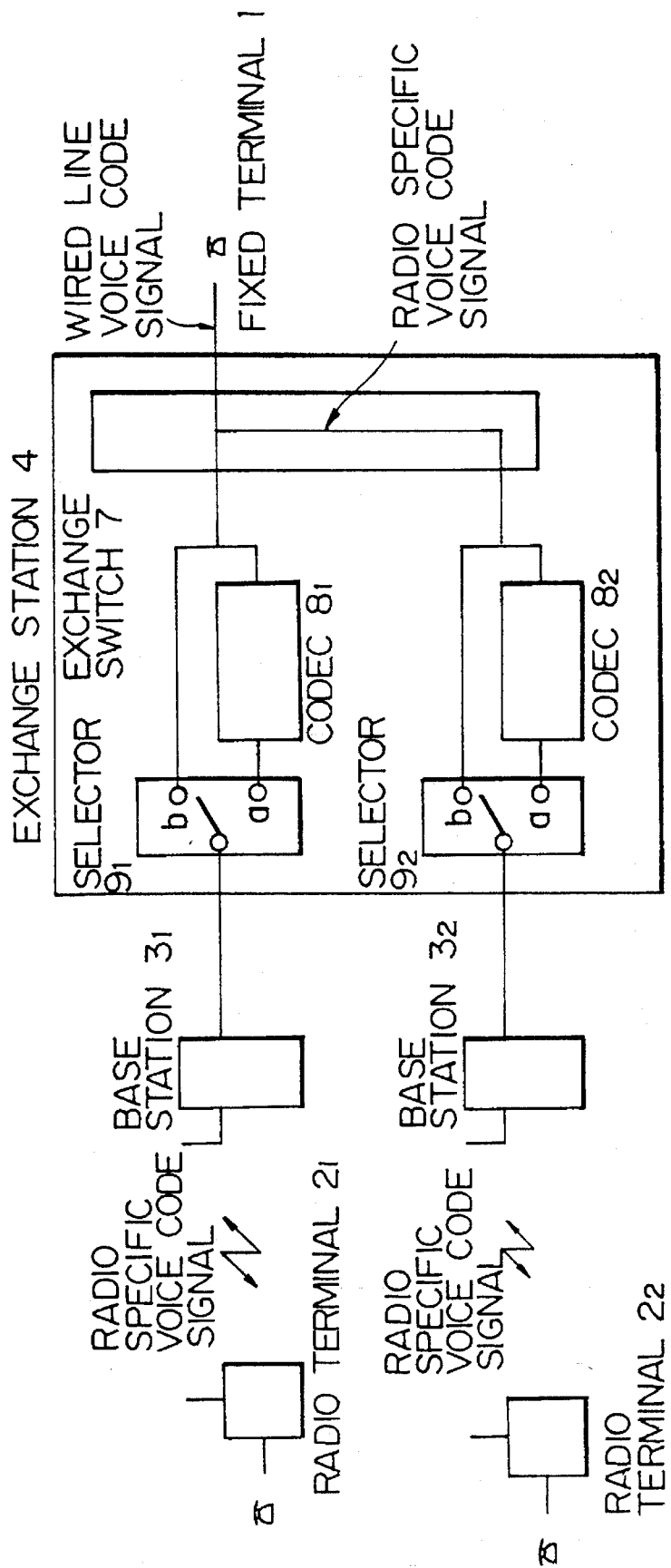
FIG. 1 shows a radio communication system according to the present invention.

FIG. 1 shows a block diagram of a radio communication system through network according to the present invention.

In the figure, the numeral 1 is a fixed terminal coupled with a fixed network, $2_1$ and $2_2$ are radio terminals which communicate with a fixed terminal 1, or a radio terminal $2_2$ or $2_1$, $3_1$ and $3_2$ are base stations which are coupled with radio terminals $2_1$ and $2_2$, respectively, through radio link. The numeral 4 is an exchange station which effects exchange service and communication control for the related terminals 1, $2_1$ and $2_2$. The numeral 7 is an exchange switch for selectively connecting a base station with a fixed terminal. The exchange switch 7 is installed in the exchange station 4. The numerals $8_1$ and $8_2$ are codecs installed in the exchange station 4 for the conversion between a first voice coding system which is used in a radio link, and a second voice coding system which is used in network. The numerals $9_1$ and $9_2$ are selectors for controlling said codecs between codec release mode and codec mode.

When a fixed terminal 1 communicates with a radio terminal $2_1$, a radio link is established between the radio terminal $2_1$ and the base station $3_1$, and the exchange switch 7 in the exchange station 4 connects the base station $3_1$ and the fixed terminal 1. The codec $8_1$ effects the conversion of the radio-specific voice code from the radio terminal $2_1$ to the wired-line voice code which is sent to the fixed terminal 1, and the conversion of the wired-line voice code from the fixed terminal to the radio-specific voice code which is sent to the radio terminal $2_1$.

When the radio terminal $2_1$ communicates with the other radio terminal $2_2$, the radio links are established between the radio terminal $2_1$ and the base station $3_1$, and between the radio terminal $2_2$ and the base station $3_2$, respectively, and the exchange switch establishes the wired line between the base stations $3_1$ and $3_2$. The selector $9_1$ and $9_2$ are switched so that the codecs $8_1$ and $8_2$ operate in codec-release mode by being connected to the contact (b). Therefore, the radio-specific voice code of the radio terminal $2_1$ is forwarded to the radio terminal $2_2$ through the base station $3_1$, the exchange station 4 and the base station $3_2$, with no code conversion.

As described above, when a fixed terminal communicates with a radio terminal which uses different voice code system from that of the fixed terminal, the codec $8_1$ in the exchange station 4 effects the conversion of the voice codes, and when a radio terminal $2_1$ communicates with another radio terminal $2_2$ which uses the same voice code system as that of the radio terminal $2_1$, the codecs $8_1$ and $8_2$ operate in codec-release mode so that no code conversion is effected. Therefore, the voice communication between different voice code systems is of course possible, and no code conversion is effected for the communication between terminals which use the same voice code system as each other so that the speech quality is not deteriorated because of the distortion by the conversion and the delay time.

Figure 2:
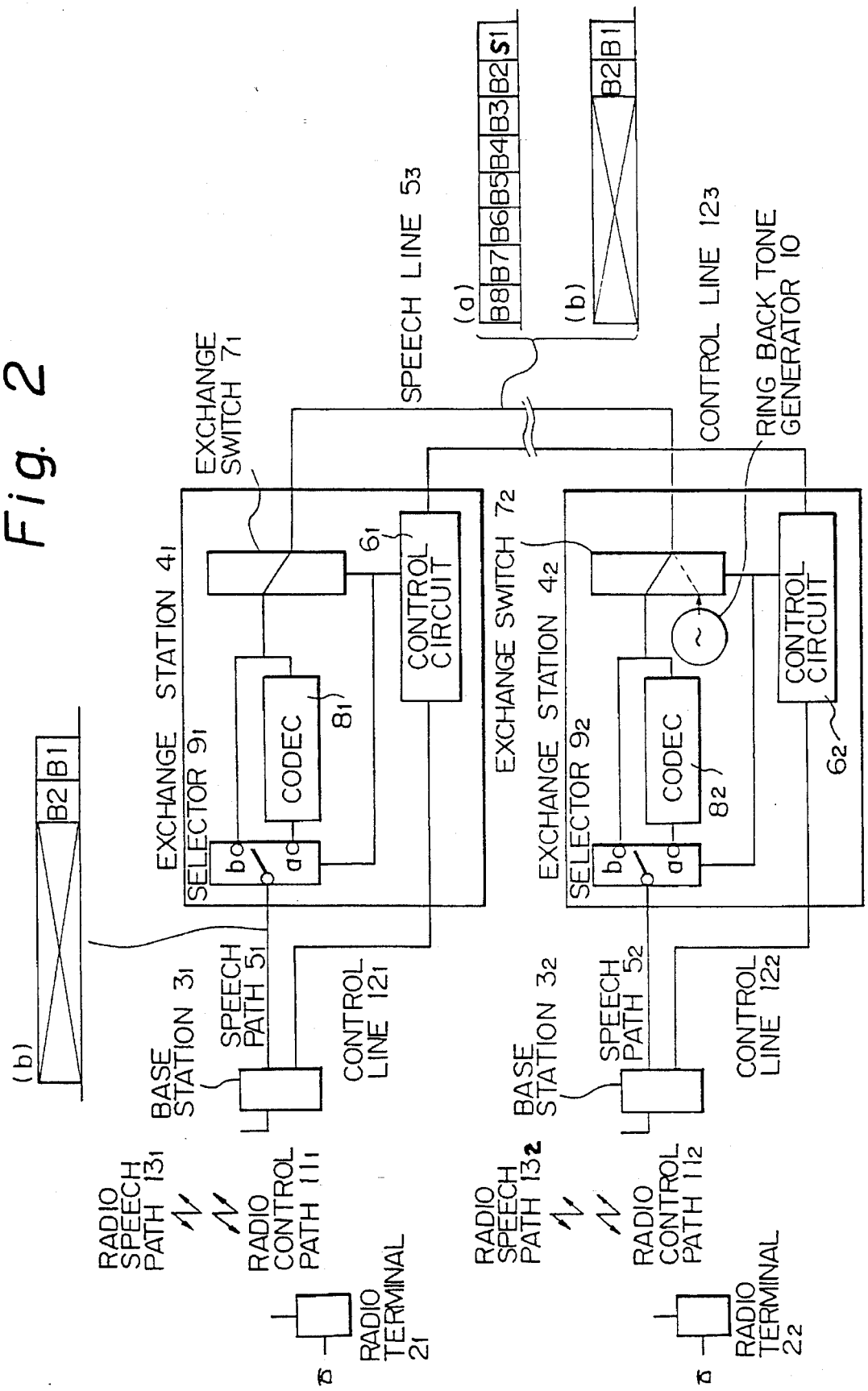
FIG. 2 shows the detailed view of the radio communication system according to the present invention.

FIG. 2 shows a modification of the present radio communication with network. In the figure, the same numerals as those in FIG. 1 show the same members. The numerals $6_1$ and $6_2$ are control circuits installed in the exchange stations $4_1$ and $4_2$, respectively. Those control circuits effect the call origination and termination control for the radio terminals $2_1$ and $2_2$ through the radio control line $11_1$ and $11_2$, and for the base stations $3_1$ and $3_2$ through the control lines $12_1$ and $12_2$, and the connection control for the exchange stations $4_1$ and $4_2$ through the control line $12_3$. The control circuits $6_1$ and $6_2$ effect also the control of the selectors $9_1$ and $9_2$ which switch the codecs between codec-release mode and codec mode, and the connection control of the exchange switches $7_1$ and $7_2$ for the speech path through the control line $12_3$. The numeral 10 is a ring back tone generator, which generates a ringing signal indicating that a radio terminal is alerting with the wired-line voice code.

In the figure, a coding system in a radio link between a radio terminal and a base station is a first voice coding system, which is for instance 8 kbps which outputs one bit in every 125 μS, or 160 bits in every 20 mS, and a coding system in a network is a second voice coding system which is for instance 64 kbps which outputs 8 bits in every 125 μS. As a fundamental period in operation of a codec is 20 mS, a synchronization bit S1 is attached to an information bit B2 so that an end of a burst of 20 mS is indicated.

A codec $8_1$, or $8_2$ effects the conversion between a first coding system (B2, S1) as shown by (b) and a second coding system (B8-B1) as shown by (a).

When a selector $9_1$ or $9_2$ is connected to the contact (a), a codec is in codec mode, and said conversion is carried out, and a codec outputs 64 kbps signal having 8 bits in every 125 μS. On the other hand, when the selector $9_1$ or $9_2$ is connected to the contact (b), the codec operates in codec-release mode, in which code conversion operation is not carried out.

In order to synchronize two related exchange stations so that both stations operate in codec mode, or codec-release mode, a control line $12_3$ is provided among the exchange stations in addition to a speech line $5_3$.

The selectors $9_1$ and $9_2$ select codec-release mode when two radio terminals communicate with each other, and select codec mode when a radio terminal communicates with a fixed terminal in a network.

Figure 3:
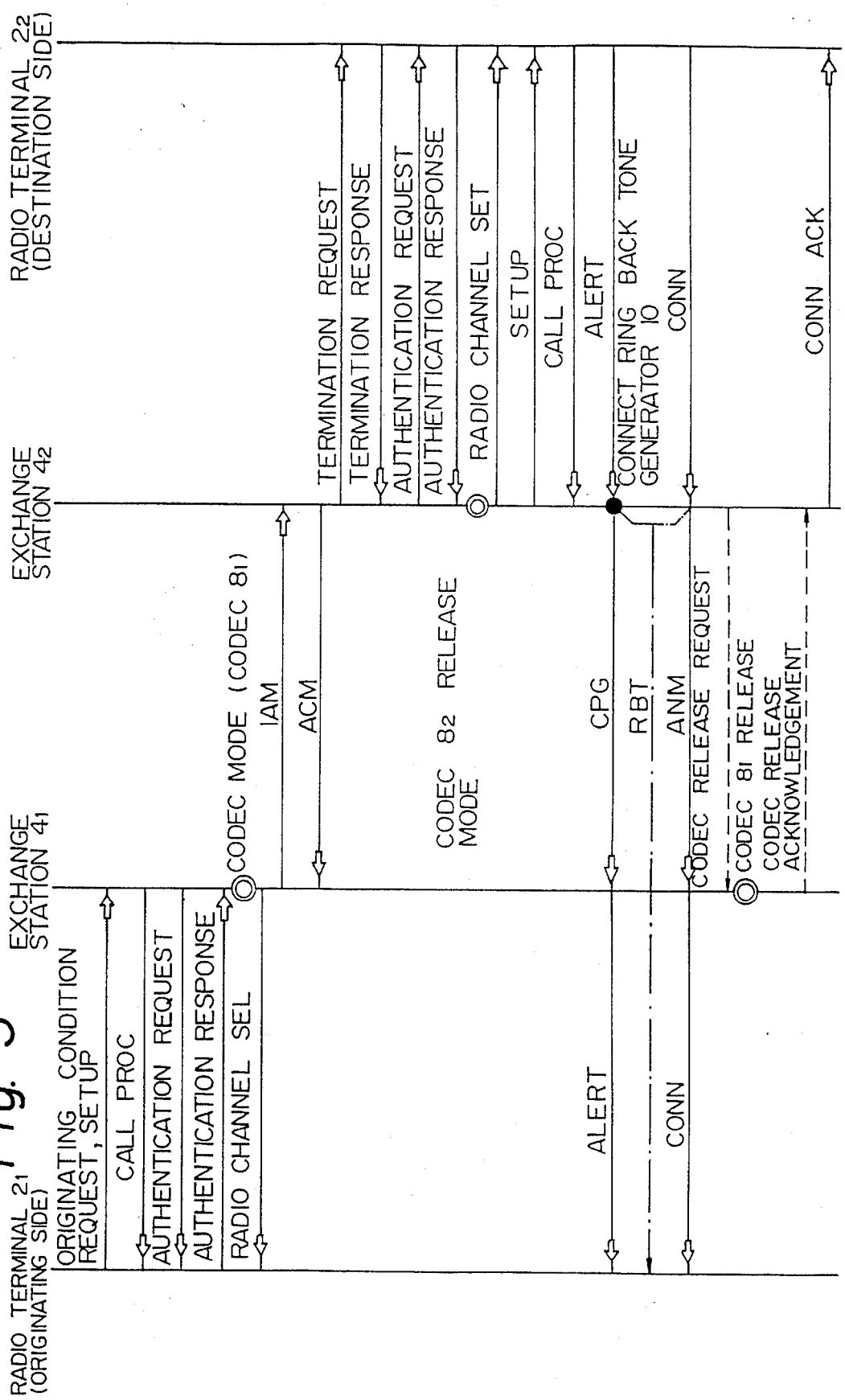
FIG. 3 shows the operation sequence of the system shown in FIG. 2.

FIG. 3 shows the time sequence of call origination and termination control, when the radio terminal $2_1$ originates a call, which is terminated by the radio terminal $2_2$.

First, the radio terminal sends a SETUP signal which is an originating condition request to the control circuit $6_1$ through the radio control link $11_1$ and the control link $12_1$. Then, the CALLPROC signal which is an authentication request and an authentication response is sent and received between the radio terminal $2_1$ and the exchange station $4_1$.

Next, the control circuit $6_1$ makes the selector $9_1$ switch to the contact (a) so that the codec $8_1$ operates in codec mode. This initial codec mode is necessary for forwarding a ring back signal which is generated by the ring back tone generator 10 to the originating radio terminal $2_1$. The ring back signal is obtained in the form of wired-line voice code signal, and it is converted to radio specific voice code signal, and is forwarded to the radio terminal $2_1$.

Next, a radio channel set signal is sent to a radio terminal $2_1$ so that a radio speech path between the radio terminal $2_1$ and the base station $3_1$ and the speech path between the base station $3_1$ and the exchange station $4_1$ are established.

The control circuit $6_1$ also anylyzes the SETUP (originating condition request), which includes a terminated address, and recognizes that the terminated address is a radio terminal, and that a codec $8_1$ must be in codec release mode during speech.

Next, the control circuit $6_1$ forwards IAM (initial address message) signal to the terminated exchange station $4_2$ through the control line $12_3$, establishes the speech path $5_3$ between the exchange stations $4_1$ and $4_2$, and makes the exchange switch $7_1$ connect the speech paths $5_1$ and $5_3$.

The control circuit $6_2$ in the terminated exchange station $4_2$ sends back the ACM (address complete message) signal to the originating exchange station $4_1$ upon receipt of said IAM signal. The control circuit $6_2$ also recognizes the terminated address which is included in the IAM signal, and sends the destination radio terminal $2_2$ the termination request signal through the control line $12_2$.

Next, the termination response signal, the authentication request signal, and the authentication response signal are exchanged between the exchange station $4_2$ and the radio terminal $2_2$. Then, the control circuit $6_2$ recognizes that an originating terminal is a radio terminal by analyzing the originating address included in the IAM signal, and then, makes the selector $9_2$ switch to the contact (b) to codec release mode. Then, the control circuit $6_2$ forwards the radio terminal $2_2$ the radio channel set signal, and establishes the radio circuit $13_2$ between the radio terminal $2_2$ and the base station $3_2$, and the speech path $5_2$ between the base station $3_2$ and the exchange station $4_2$.

Next, the control circuit $6_2$ makes the exchange station $4_2$ send and receive SETUP signal, and CALLPROC (call processing) signal to and from the radio terminal $2_2$, through the radio control line $11_2$, and the wired control line $12_2$.

When the exchange station $4_2$ receives the ALERT signal from the radio terminal $2_2$, the exchange station $4_2$ sends the exchange station $4_1$ the CPG (call progress message) signal through the control line $12_3$. Then, the exchange station $4_1$ sends the ALERT signal to the originating radio terminal $2_1$ through the wired control line $12_1$ and the radio control line $11_1$.

Then, the control circuit $6_2$ in the exchange station $4_2$ makes the exchange switch $7_2$ connect the ring back tone generator 10 to the speech path $5_3$ so that the ring back tone (RBG) is sent back to the originating radio terminal $2_1$ to inform the same that the destination radio terminal is ringing. Thus, the ring back tone which is in wired-line voice code generated by the ring back tone generator 10, is forwarded to the originating radio terminal $2_1$, through the exchange switch $7_2$, the speech path $5_3$, the exchange switch $7_1$, the codec $8_1$ which converts the wired-line voice code to the radio specific voice code, the selector $9_1$, the speech path $5_1$, the base station $3_1$, and the radio path $13_1$.

When the destination radio terminal $2_2$ hangs up a handset to make a response to ringing, the destination radio terminal $2_2$ sends the CONN (connect) signal to the exchange station $4_2$ through the radio control path $11_2$ and the wired control path $12_2$. Then, the control circuit $6_2$ in the exchange station $4_2$ forwards ANM (answer message) signal to the originating exchange station $4_1$ through the control line $12_3$. Then, the originating exchange station $4_1$, upon receipt of the ANM signal, forwards the CONN signal to the originating radio terminal $2_1$ through the wired control line $12_1$ and the radio control line $11_1$.

At the same time, the destination control circuit $6_2$ in the destination exchange station $4_2$ makes the exchange switch $7_2$ release the ring back tone generator 10, and connect the speech paths $5_2$ and $5_3$, and the control circuit $6_2$ forwards the originating exchange station $4_1$ the codec release request signal.

Upon receipt of said codec release request signal in the originating exchange station $4_1$, the control circuit $6_1$ in the exchange station $4_1$ makes the selector $9_1$ connect to the contact (b) so that the codec $8_1$ is released, and forwards the destination exchange station $4_2$ the codec release acknowledgement signal.

Upon receipt of the codec release acknowledgement signal, the destination exchange station $4_2$ forwards the radio terminal $2_2$ the CONNACK (connect acknowledge) signal.

Thus, the speech path between the radio terminals $2_1$ and $2_2$ is established, so that the radio specific voice code generated in each radio terminal is forwarded to another radio terminal with no conversion of said voice code to wired line voice code. And, an excellent speech quality with no code conversion is obtained.

Figure 4:
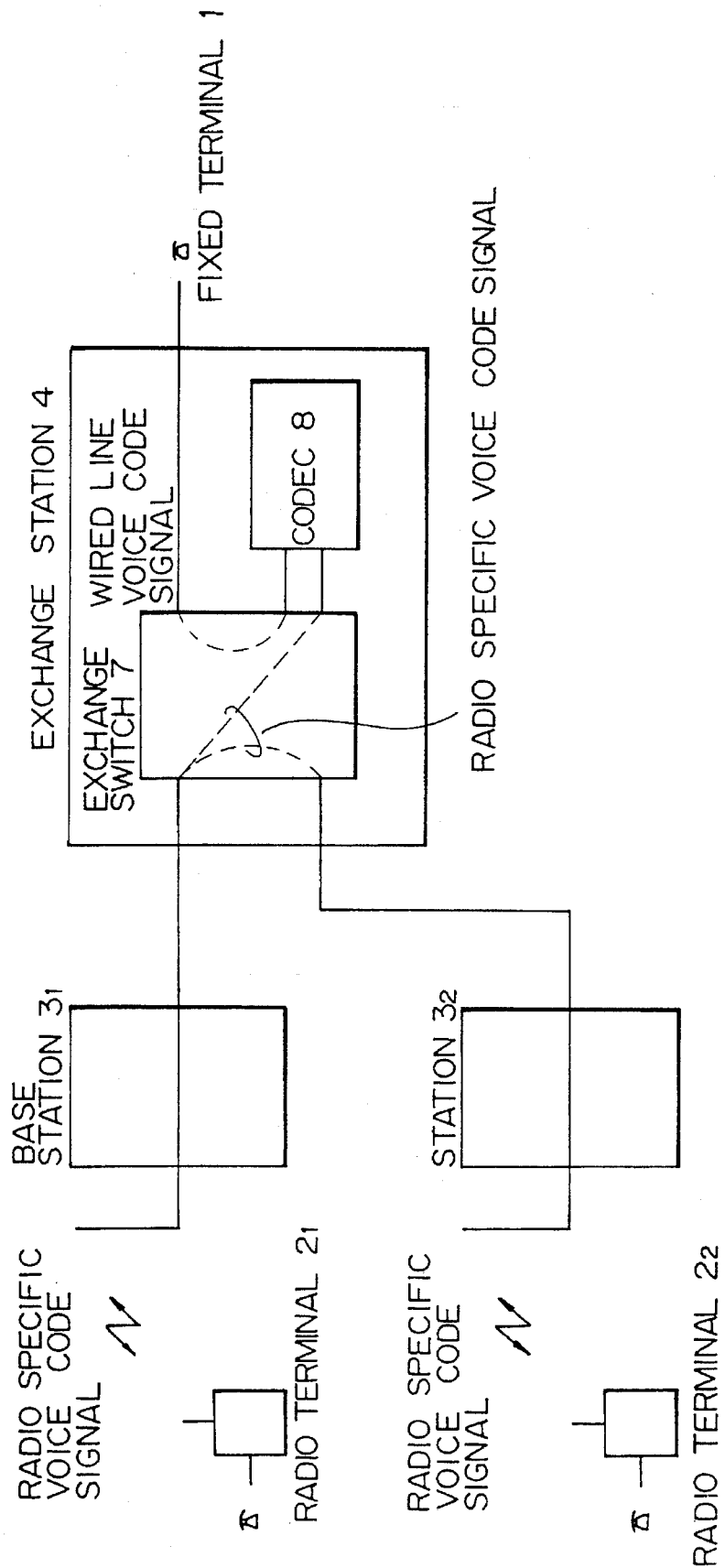
FIG. 4 shows another radio communication system according to the present invention.

FIG. 4 shows the modification of the present radio communication system, in which a selector 9 is removed, and instead, both input and output of a codec 8 are connected to an exchange switch 7.

When a fixed terminal 1 communicates with a radio terminal $2_1$, the fixed terminal 1 is connected to the codec 8 through the exchange switch 7, which also connects the codec 8 to the base station $3_1$ which is coupled with the radio station $2_1$, so that the codec 8 converts the radio specific voice code from the radio terminal $2_1$ to the wired line voice code which is forwarded to the fixed terminal 1, and also converts the wired line voice code from the fixed terminal 1 to the radio specific voice code which is forwarded to the radio terminal $2_1$.

When the radio terminal $2_1$ communicates with the radio terminal $2_2$, the exchange switch 7 connects the base station $3_1$ which is coupled with the radio station $2_1$ to the base station $3_2$ which is coupled with the radio terminal $2_2$, and the codec 8 is released. Thus, the radio specific voice code from each radio station is forwarded to another radio terminal with no code conversion.

A control circuit is not shown in FIG. 4 for the sake of the simplicity of the figure, but of course a control circuit corresponding to that of FIG. 2 is provided in the apparatus of FIG. 4, and also a control line for forwarding a codec control signal or a selector control signal is provided in FIG. 4.

Figure 5:
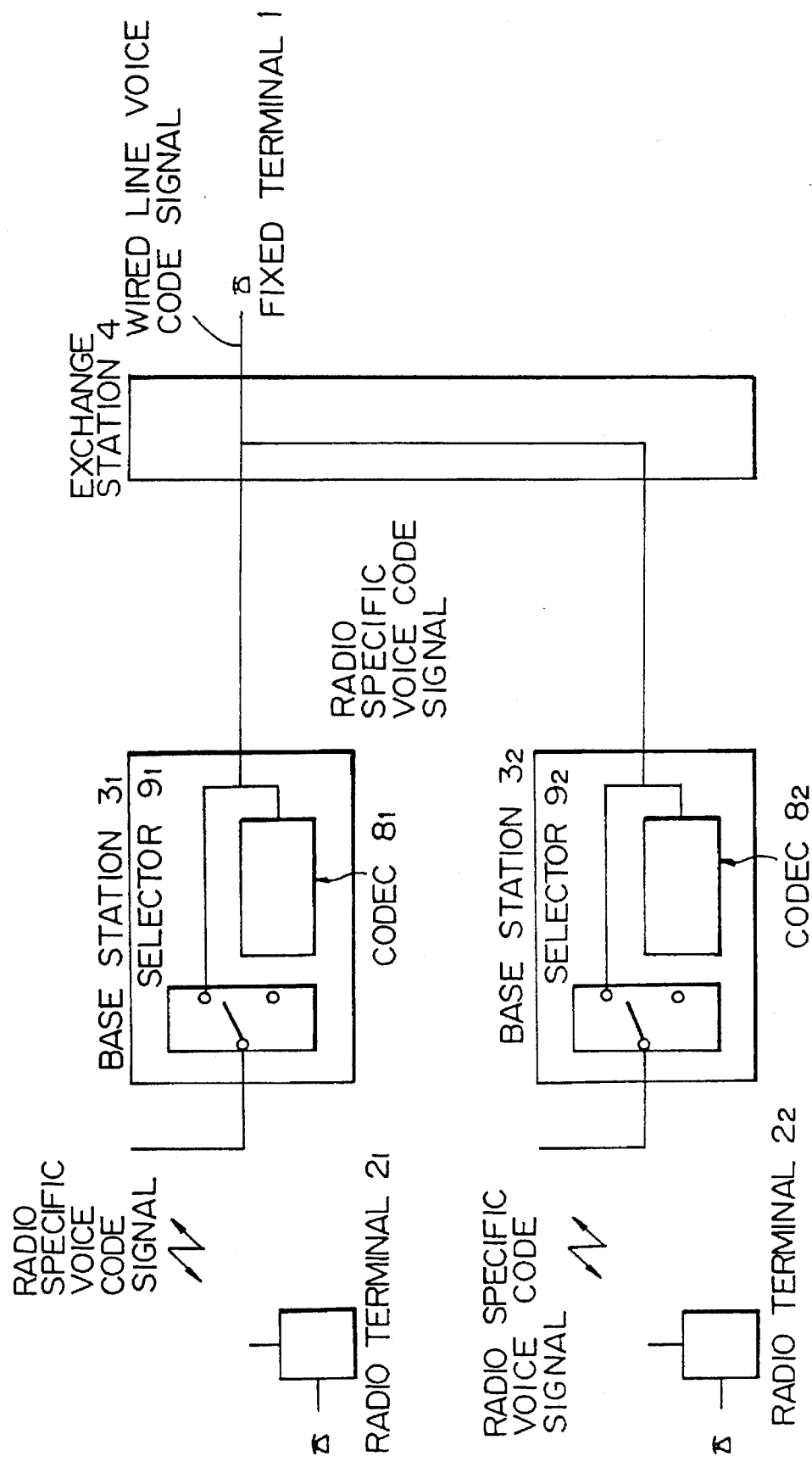
FIG. 5 shows still another radio communication system according to the present invention.
Figure 6:
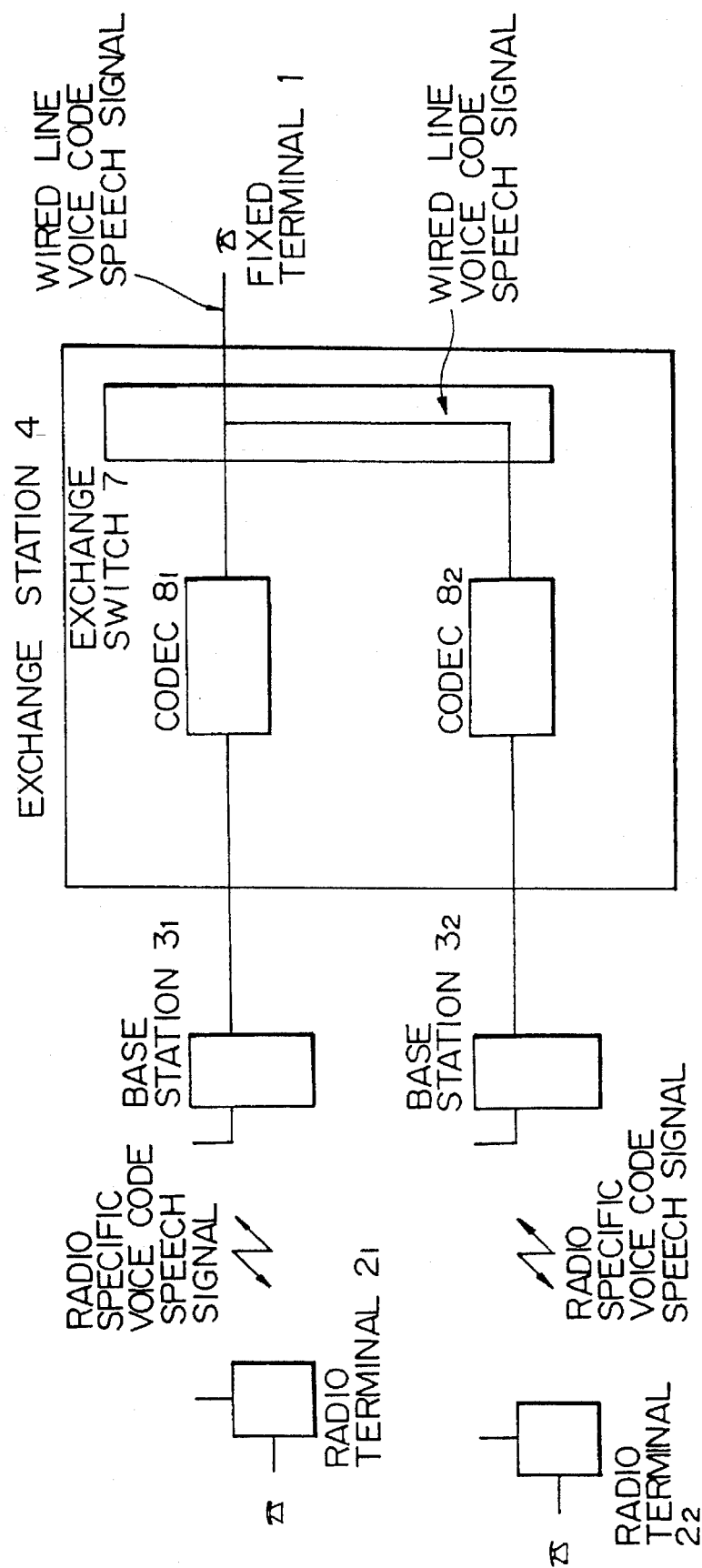
FIG. 6 shows the conventional radio communication system.

FIG. 5 shows another modification of the present radio communication system. The structure of FIG. 5 is essentially the same as that of FIG. 2, except that codecs $8_1$ and $8_2$ are installed in a base station together with a related selector, while the codec and the related selector are installed in an exchange station in FIG. 2. A control line for controlling a selector is provided although it is not shown in the drawing.

From the foregoing it will now be apparent that a new and improved radio communication system has been discovered. It should be understood of course that the embodiments disclosed are merely illustrative and are not intended to limit the scope of the invention. Reference should be made to the appended claims, therefore, rather than the specification as indicating the scope of the invention.

What is claimed is:

1. A radio communication system comprising;

a plurality of radio terminals which operate with a first voice coding system, a network coupled with said plurality of radio terminals through a plurality of radio links, said network having a plurality of base stations for coupling the network with said plurality of radio terminals through said plurality of radio links, a plurality of exchange stations, each having an exchange switch coupled with a corresponding base station of said plurality of base stations and also with fixed terminals of a fixed network operating with a second voice coding system, for exchanging calls between terminals, and a plurality of codecs coupled between said plurality of base stations and said fixed network for converting voice coding systems between said first voice coding system and said second voice coding system, each of said voice coding systems having voice carrying lines that carry voice signals represented by a plurality of voice-representative digital bits, said network including a plurality of selectors for switching respective codecs between a codec release mode and a codec mode, a plurality of control circuits for controlling the switching by said selectors, and a control line, separate from voice carrying lines of said voice coding systems, coupled between said control circuits in different exchange stations for control of said control circuits during operation on said voice carrying lines, such that said selectors are operative to select a codec release mode when a radio terminal communicates with another radio terminal through said network, and to select a codec mode for conversion between said first voice coding system and said second voice coding system when a radio terminal communicates with a fixed terminal/such that none of the digital bits on the voice carrying lines is used for switching between codec release mode and codec mode, and the digital bit resolution on said voice carrying lines is retained without deterioration by the switching.

2. A radio communication system according to claim 1, wherein said selectors are implemented by said exchange switches.

3. A radio communication system according to claim 1, wherein said control circuits are operative to control said codecs such that when two radio terminals communicate with each other, a codec in an originating side is first in codec mode, and switched to codec release mode after a response for ringing by a destination terminal is acknowledged, and a codec in a destination side is in codec release mode when a destination terminal is recognized by said control circuits as a radio terminal.

* * * * *